United States Patent [19]

Sakabe et al.

[11] Patent Number: 4,618,912

[45] Date of Patent: Oct. 21, 1986

[54] MONOLITHIC CERAMIC CAPACITOR

[75] Inventors: Yukio Sakabe; Shintaro Karaki; Kiyoshi Nakano, all of Nagaokakyo, Japan

[73] Assignee: Murata Manufacturing Co., Ltd., Japan

[21] Appl. No.: 754,393

[22] Filed: Jul. 12, 1985

[30] Foreign Application Priority Data

Aug. 13, 1984 [JP] Japan .................................. 59-169579

[51] Int. Cl.⁴ .......................... H01G 1/14; H01G 4/12
[52] U.S. Cl. ..................................... 361/309; 361/321
[58] Field of Search ................ 361/321, 308, 309, 310

[56] References Cited

U.S. PATENT DOCUMENTS 4,071,880  1/1978  Rutt ...................................... 361/309
4,458,294  7/1984  Womack .............................. 361/321
4,467,396  8/1984  Leupold et al. ...................... 361/321

Primary Examiner—Donald A. Griffin
Attorney, Agent, or Firm—Ostrolenk, Faber, Gerb & Soffen

[57] ABSTRACT

A monolithic ceramic capacitor implemented by a sintered body obtained by laminating a plurality of ceramic green sheets and simultaneously firing the same. Internal electrodes are formed by a lead or a lead alloy injected into a plurality of gaps opening in either side of a pair of end surfaces of the sintered body. External electrodes are provided on the pair of end surfaces and are formed by first layers mainly composed of nickel and second layers mainly composed of tin and provided on the outer sides of the first layers.

4 Claims, 2 Drawing Figures

4,618,912

MONOLITHIC CERAMIC CAPACITOR

BACKGROUND OF THE INVENTION

1. Field of the Invention

The present invention relates to an improvement in structure of a monolithic ceramic capacitor in which internal electrodes are formed by defining gaps in a ceramic member to inject molten lead or lead alloy into the gaps.

2. Description of the Prior Art

FIG. 2 is a sectional view showing an example of a conventional monolithic ceramic capacitor which has motivated the present invention. A monolithic ceramic capacitor 1 as shown in FIG. 2 comprises a plurality of internal electrodes 3 laminated through a ceramic member 2 and a pair of external electrodes 4 and 5 connected with prescribed ones of the internal electrodes 3 to extract the electrostatic capacity. This monolithic ceramic capacitor 1 is manufactured in the following manner: A plurality of ceramic green sheets in thickness of about 50 to 100 μm are prepared to be printed with paste of carbon powder or a mixture of carbon powder and ceramic powder. Then the plurality of ceramic green sheets are laminated and fired so that the carbon powder is dissipated by combustion to define gaps in portions to be provided with the internal electrodes 3. Thereafter porous Ag-fired layers are formed on end surfaces of the ceramic member 2 to define the external electrodes 4 and 5. The chip thus obtained is dipped under decompression in molten lead of about 330° to 360° C. while pressurizing the space above the molten lead thereby to inject the molten lead into the gaps defined in the ceramic member 2. Then the chip dipped in the molten lead is taken out from the same to be cooled and returned to the atmospheric pressure to form the internal electrodes 3. Thus, the internal electrodes 3 can be formed by lead which is low-priced base metal, whereby the monolithic ceramic capacitor 1 can be obtained at a low cost.

In order to manufacture the aforementioned monolithic ceramic capacitor 1, the Ag layers for forming the external electrodes 4 and 5 are provided in advance of injection of the material for the internal electrodes 3 so as to prevent leakage of the molten lead from the gaps that may be caused when the chip is taken out from the molten lead even if pressure regulation is performed sequentially (decompressed state - pressurized state - atmospheric pressure state), by previously forming the porous external electrodes 4 and 5. However, when the chip is dipped in the molten lead, porous Ag forming the external electrodes 4 and 5 is dissolved in the molten metal whereby the external electrodes 4 and 5 are dissipated or eroded and cannot effectively prevent the aforementioned leakage of the molten lead from the gaps. Further, lead reacts with Ag to define a Pb-Ag alloy layer to cause difficulty in soldering in a next step of mounting the chip on a substrate or connecting the same with lead wires.

An example of the conventional monolithic ceramic capacitor in the aforementioned structure is disclosed in U.S. Pat. No. 4,071,880 issued on Jan. 31, 1978 to T. C. Rutt. This prior art example shows penetrable barriers made of palladium-silver or palladium-gold for forming external electrodes. Consequently, the penetrable barriers may be easily eroded by the molten lead, while the cost for forming the external electrodes is increased.

SUMMARY OF THE INVENTION

Accordingly, an object of the present invention is to provide a monolithic ceramic capacitor which is provided with low-cost external electrodes formed by first layers which are nonreactive with molten lead and are not dissipated upon injection of the molten lead and second layers having excellent solderability.

Briefly stated, the present invention provides a monolithic ceramic capacitor which comprises a plurality of internal electrodes laminated through a ceramic member and a pair of external electrodes connected with prescribed ones of the internal electrodes to extract the electrostatic capacity. The internal electrodes are composed of lead or a lead alloy and are formed by injecting molten lead or lead alloy into gaps defined in the ceramic member fired in advance while the external electrodes are formed by first layers mainly composed of nickel and second layers provided on the outer sides of the first layers and mainly composed of tin or lead-tin.

In a preferred embodiment of the present invention, the first layers are provided in advance of injection of the molten lead or lead alloy for forming the internal electrodes while the second layers are formed after the injection of the molten lead or lead alloy.

According to the present invention, the external electrodes are provided with the first layers mainly composed of nickel, which is not specifically reactive with the molten lead, whereby the external electrodes are prevented from dissipation or erosion by the molten lead. Further, the first layers are provided on the outer sides thereof with the second layers mainly composed of tin or lead-tin, whereby adhesion with solder is improved. The first layers have a porous structure sufficient to permit penetration of molten metal.

The above and other objects, features, aspects and advantages of the present invention will become more apparent from the following detailed description of the present invention when taken in conjunction with the accompanying drawings.

DESCRIPTION OF THE PREFERRED EMBODIMENT

Figure 1:
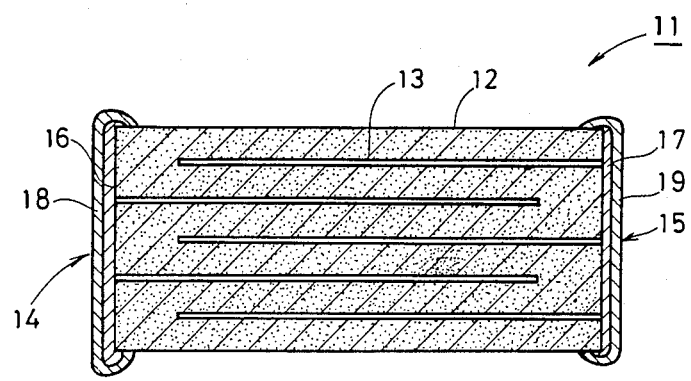
FIG. 1 is a sectional view showing an embodiment of the present invention.
Figure 2:
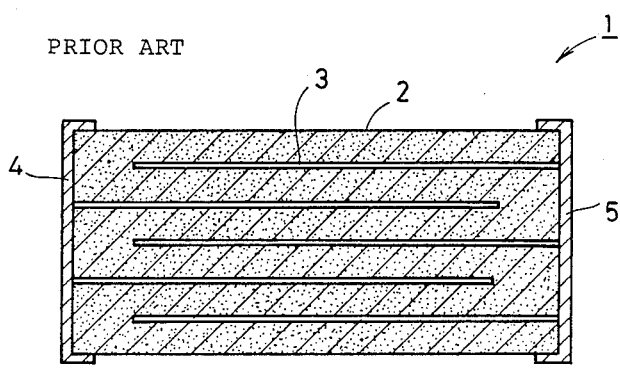
FIG. 2 is a sectional view showing a conventional injection-type monolithic ceramic capacitor which has motivated the present invention.

FIG. 1 is a sectional view showing an embodiment of the present invention, in which a plurality of internal electrodes 13 are laminated in and through a ceramic member 12. Provided on end surfaces of the ceramic member 12 are a pair of external electrodes 14 and 15 which are connected with prescribed ones of the internal electrodes 13 for extracting the electrostatic capacity. The internal electrodes 13 are formed in a similar manner to those of the monolithic ceramic capacitor 1 as shown in FIG. 2 by printing paste of carbon powder or a mixture of carbon powder and ceramic powder on ceramic green sheets to laminate and fire the same thereby to define gaps in portions to be provided with the internal electrodes 13 and then injecting molten lead or lead alloy. As to a definite method of forming the internal electrodes 13, the method disclosed in the aforementioned U.S. Pat. No. 4,071,880 may be applied and the content thereof is incorporated by reference in this specification.

The external electrodes 14 and 15 respectively comprise first layers 16 and 17 mainly composed of nickel and second layers 18 and 19 mainly composed of tin or lead-tin. The first layers 16 and 17 mainly composed of nickel are formed before injection of the material for the internal electrodes 13, which are then formed by injection of the molten lead or lead alloy, and thereafter the second layers 18 and 19 are formed by, e.g., electrolytic plating.

Although the first layers 16 and 17 forming the external electrodes 14 and 15 are mainly composed of nickel, they may also contain other components such as boron and lead, while the second layers 18 and 19 may also contain other components in addition to tin or the lead-tin alloy. In the embodiment as shown in FIG. 1, the external electrodes 14 and 15 having the first layers 16 and 17 are mainly composed of nickel which is nonreactive on lead, and hence no reaction takes place between the molten lead and the first layers 16 and 17 during formation of the internal electrodes 13 by injecting the molten lead into the gaps, whereby the external electrodes 14 and 15 are prevented from dissipation or lead erosion, to effectively prevent leakage of the molten lead. Further, the second layers 18 and 19 are mainly composed of tin or lead-tin so as to secure solderability of the ceramic capacitor 11 thus obtained. A description will now be presented of a specific Example of the present invention. Two Reference Examples wil also be described. A plurality of ceramic green sheets were printed in portions to be provided with the internal electrodes 13 with paste of 70 to 95 percent by weight of carbon powder and 5 to 30 percent by weight of ceramic powder to be laminated and connected with each other under pressure, and fired by heating up to 1300° C. at the speed of 200° C./hour for two hours, and thereafter naturally cooled. In the sintered chip thus obtained, the carbon powder printed in the portions corresponding to the internal electrodes was dissipated thereby to define porous gaps in which ceramic grains were cylindrically formed. The sintered chip was coated on both end surfaces for forming the electrodes with paste prepared of $Ni_3B$ and borosilicate lead glass frit, in this Example, and was fired in the natural atmosphere. Reference Examples 1 and 2 were respectively prepared by coating a paste of Ag with borosilicate lead glass frit, and a paste of Ag-Pd with borosilicate lead glass frit, on electrode-extracting end surfaces of sintered chips, to fire the same in the natural atmosphere. The firing temperatures were 600° C. for the Example, 800° C. for the Reference Example 1 with the paste containing Ag and 850° C. for the Reference Example 2 with that containing Ag-Pd. In the Example, and in Reference Examples 1 and 2, the electrodes thus formed have a porous structure sufficient to permit penetration of molten metal.

The sintered chips of the Example and Reference Examples 1 and 2 prepared in the aforementioned manner were contained in high-pressure vessels filled with molten lead to be decompressed to 2 to 10 mmHg and dipped in molten lead, and then the vessels were pressurized to 10 to 15 atm for 5 seconds to 2 minutes employing nitrogen gas so that the molten lead is not oxidized. Then the chips were taken out from the molten lead and cooled to a temperature at which lead is hardened, and returned to the natural pressure and brought out from the high-pressure vessels.

Table 1 shows residual area rates (%) of the external electrodes in the Example and Reference Examples 1 and 2 in case where the times for dipping the chips in the molten lead were changed.

TABLE 1

| Dipping Time | Example $Ni_3B$ | Ref. Example 1 Ag | Ref. Example 2 Ag—Pd |
|---|---|---|---|
| 5 sec. | 100% | 5–5% | 50–90% |
| 10 sec. | 100% | 0 | 0–20% |
| 20 sec. | 100% | 0 | 0 |
| 30 sec. | 100% | — | 0 |
| 60 sec. | 100% | — | — |
| 120 sec. | 100% | — | — |

It is understood that the external electrodes were dissipated by reaction with the molten lead in the Reference Examples 1 and 2, i.e., the chips respectively coated with the paste of Ag and that of Ag-Pd, while no dissipation of the external electrodes took place in the Example, i.e., the chip coated with $Ni_3B$ even if the chip was dipped in the molten lead for two minutes. The chip capacitor thus provided with the first layers according to the above embodiment was introduced in an electrolytic tin plating bath to be subjected to electricity for 15 minutes, thereby to apply tin plating on the first layers, said first layers being Ni thick film layers. The ceramic capacitor thus obtained according to the embodiment of the present invention is easily soldered for connection with lead wires while the external electrodes are not eroded by solder, whereby obtained is a lead-injection type monolithic ceramic capacitor with improved solderability.

Although tin was electrolytically plated for forming the second layers of the external electrodes in the aforementioned Example, such plating may be performed by employing a tin-lead alloy containing lead in excess of, e.g., 3 percent by weight.

Further, the molten lead is not restricted to pure lead, and may be prepared by a molten lead alloy having a low melting point.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A monolithic ceramic capacitor comprising a sintered body obtained by laminating a plurality of ceramic green sheets and simultaneously firing the same,
   said sintered body having a plurality of gaps opening in either side of a pair of end surfaces of said sintered body,
   said monolithic ceramic capacitor further including:
   a plurality of internal electrodes formed by injecting molten lead or lead alloy into said gaps; and
   a pair of external electrodes provided on said pair of end surfaces of said sintered body for extracting the electrostatic capacity,
   said external electrodes being formed of respective first layers including a fired paste mainly composed of $Ni_3B$ and respective second layers provided on the outer sides of said first layers.

2. A monolithic ceramic capacitor in accordance with claim 1, wherein said first layers are provided in advance of injection of said lead or lead alloy to serve as barriers for forming said internal electrodes, said second layers being formed after said injection.

3. A monolithic ceramic capacitor in accordance with claim 1, wherein said second layers are mainly composed of tin or lead-tin.

4. A monolithic ceramic capacitor in accordance with claim 1, wherein said paste mainly composed of $Ni_3B$ comprises $Ni_3B$ and borosilicate.

* * * * *